US006970453B2

(12) United States Patent
Bienn et al.

(10) Patent No.: US 6,970,453 B2
(45) Date of Patent: Nov. 29, 2005

(54) SYSTEM INTERFACE SUPPORTING IP ENDPOINT DATA EXCHANGE AND REGULATION

(75) Inventors: Marvin Bienn, Dallas, TX (US); Curtis Provost, Parker, TX (US)

(73) Assignee: Nortel Networks Limited, St. Laurent (CA)

( * ) Notice: Subject to any disclaimer, the term of this patent is extended or adjusted under 35 U.S.C. 154(b) by 921 days.

(21) Appl. No.: 09/899,423

(22) Filed: Jul. 5, 2001

(65) Prior Publication Data

US 2002/0039353 A1    Apr. 4, 2002

Related U.S. Application Data

(60) Provisional application No. 60/237,646, filed on Oct. 3, 2000.

(51) Int. Cl.[7] ............................................. H04L 12/64
(52) U.S. Cl. ....................................... 370/354; 370/475
(58) Field of Search ............................... 370/338, 340, 370/352, 354, 475

(56) References Cited

U.S. PATENT DOCUMENTS

| | | | |
|---|---|---|---|
| 6,636,491 B1 * | 10/2003 | Kari et al. .................. | 370/328 |
| 6,687,252 B1 * | 2/2004 | Bertrand et al. ............ | 370/401 |
| 6,711,143 B1 * | 3/2004 | Balazinski et al. ......... | 370/329 |
| 2001/0017856 A1 * | 8/2001 | Asokan et al. .............. | 370/389 |
| 2002/0150084 A1 * | 10/2002 | Lee et al. .................... | 370/352 |
| 2003/0039237 A1 * | 2/2003 | Forslow ...................... | 370/352 |
| 2003/0081607 A1 * | 5/2003 | Kavanagh ................... | 370/392 |
| 2004/0116140 A1 * | 6/2004 | Babbar et al. .............. | 455/517 |

OTHER PUBLICATIONS

Bettstetter, Christian et. al.; "GSM Phase 2+ General Packet Radio Service GPRS: Architecture, Protocols, and Air Interface"; IEEE (1999).

La Poria, Thomas et. al.; "Mobile IP and Wide Area Wireless Data," IEEE (1998).

Buckingham, Simon; "An Introduction to the General Packet Radio Service"; GSM World (Jan. 2000).

Perkins, Charles; "Mobile Networking Through Mobile IP"; IEEE Internet Computing On-Line (1997).

Perkins, C; "RFC 2002: IP Mobility Support," Network Working Group (Oct. 1996).

* cited by examiner

Primary Examiner—Melvin Marcelo
(74) Attorney, Agent, or Firm—Hemingway, LLP; D. Scott Hemingway; Malcolm W. Pipes

(57) ABSTRACT

The present invention supports the initialization of an interface between a wireless network and a packet-based communication network, including the exchange of initial endpoint address information and the revision of such endpoint address information through an addition and/or deletion procedure.

20 Claims, 2 Drawing Sheets

SYSTEM INTERFACE SUPPORTING IP ENDPOINT DATA EXCHANGE AND REGULATION

Related Application Data

This application is related to Provisional Patent Application Ser. No. 60/237,646 filed on Oct. 3, 2000.

Technical Field of the Invention

An interface system and method for supporting the exchange and regulation of packet-based endpoint information.

BACKGROUND OF THE INVENTION

In a telecommunications system, the devices involved with a telecommunications call or connection are referred to as the originating device and the terminating device, respectively. The originating device is where the user initiates the communication, and the terminating device is the device used by the person called by the originating device. To initiate a telecommunications communication, the user typically enters an identifying number of the person called into the originating device.

If the telecommunications call is made on a traditional telecommunication network, the originating device will accept the entry of the identifying number and perform a call setup procedure that establishes, among other things, a switched connection between the originating device and the terminating device. On a traditional telecommunications network, this switched connection will maintain an open connection between the originating and terminating device during the telecommunication call.

In Internet Protocol (IP) networks, the communication process is very different from a traditional telecommunication system. In an IP network, there is no open switched connection established between the originating and terminating devices. The information being transmitted between the originating and terminating devices is broken into packets of data, each of which is transmitted independently over the network to the terminating devices. Upon receipt by the terminating devices, the packets are reassembled into a coherent stream of voice or data.

A wireless communication system is very different from a traditional land-based communication system. For instance, a cellular system operates on a grid of cellular sites where two-way radio transmissions support the communication. Wireless networks can operate using different communication protocols, and hybrid systems are available which use packet-based communications on a wireless network.

In order for different types of telecommunication networks to communicate, there is a need for a consistent scheme for routing of data across the system boundaries, especially on interface boundaries between a wireless network and a packet-based communication system.

SUMMARY OF THE INVENTION

The present invention is directed to establishing and regulating the transmission of information packets (e.g., IP packets) over an interface between a wireless network and a packet-based network. When a mobile node initiates a communication over a wireless network onto a packet-based network, the endpoint address of the mobile node must be initially registered with the packet-based network prior to completing the communication. The present invention is directed to a unique method of exchanging end point address information over a system boundary for the initiation and maintenance of the communication interface.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
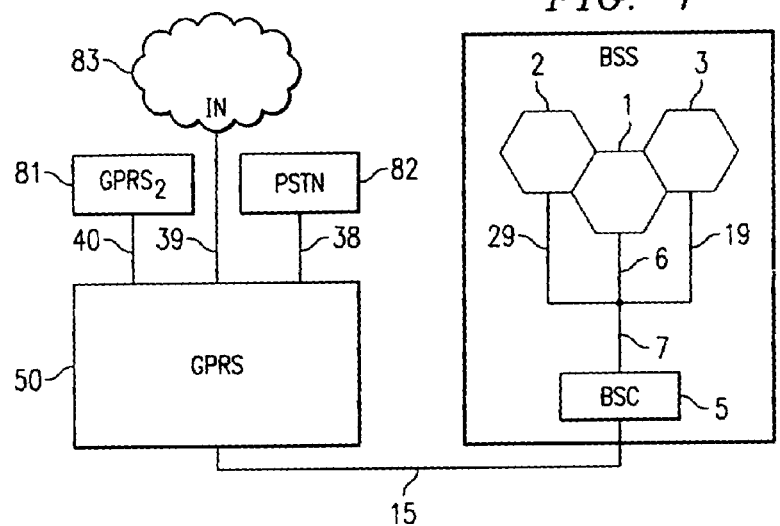
FIG. 1 is a schematic diagram of a mobile wireless communications network.

A typical cellular communication system is comprised of multiple cell sites operating over a geographic region. Referring to FIG. 1, cell site 1 supports wireless communication with mobile nodes (e.g. cellular phones, laptop computers, palm pilot devices, etc.) within that cell site service area. Other cell sites 2 and 3 are located next to cell site 1 on FIG. 1, and each cell site 2 and 3 supports wireless communications in their respective areas.

The Base Station Controller ("BSC") 5 is coupled to the cellular site 1 by signal lines 6 and 7. The BSC 5 is coupled to cellular site 3 via signal line 19 and 7, and the BSC 5 is coupled to cellular site 2 via signal line 29 and 7. The BSC 5 supports the transmission of voice and data communications on the cellular wireless network, and the BSC 5 allows for the continuity of transmissions to and from mobile nodes as the mobile node roams the wireless network from one cellular site to another (e.g. cell site 1 to cell site 2). The BSC 5 will also control other components in the cellular sites to further support the transmission of voice and data on the wireless network. Collectively, the BSC 5 and its associated components can be called a Base Station Subsystem ("BSS") network 70. The BSC 5 can also be individually referred to as the BSS.

General Packet Radio Service ("GPRS") network 50 is shown in FIG. 1. The BSC 5 unit is coupled to a GPRS 50 through interface signal line 15. The GPRS system 50 supports the transmission of IP packets, and other types of packeted data, over a communication infrastructure. The GPRS 50 provides packet-based access to a mobile node on the wireless network 70 through the Gb interface signal line 15.

The GPRS 50 is also coupled to other types of networks, such as GPRS$_2$ 81, a Public Switched Telephone Network (PSTN) 82, and the Internet 83. The GPRS 50 is coupled to the GPRS$_2$ 81 via communication link 40. The GPRS 50 is coupled to the PSTN 82 via communication link 38, and the GPRS 50 is coupled to the Internet 83 via communication link 39.

The mobile node on cellular site 1 supports a wireless communication from a subscriber, mobile unit user, or a mobile station in the cell site 1 service area. In this manner, a mobile node operating on the cellular site 1 of BSS 70 can communicate on the Internet 83 or the PSTN 82, for example, through the Gb interface 15 and the GPRS 50.

Figure 2:
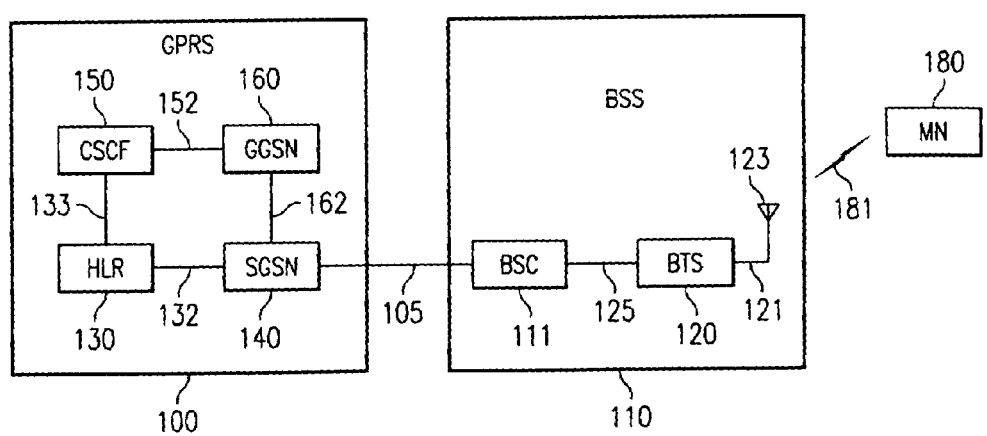
FIG. 2 is a schematic diagram of a telecommunications network including a mobile wireless/General Packet Radio Service network.

FIG. 2 shows more internal details of a General Packet Radio Service (GPRS) wireless telecommunications network 100 coupled to a BSS 110 via Gb interface signal line 105. The Gb interface signal line 105 is coupled to the BSS 110 through its associated BSC 111. The BSC 111 is in turn coupled to a Base Transceiver Subsystem (BTS) 120, supporting wireless communications on a cellular site. The BSC 111 is coupled to the BTS 120 via communication line 120. The BTS 120 is coupled to an antenna 123 via communication line 125. The antenna supports wireless communications with the mobile node 180 via the wireless communication link 181.

The GPRS network 100 comprises HLR 130 coupled to the SGSN 140 via signal line 132. The GPRS 100 also comprises a CSCF 150 coupled to a GGSN 160 via signal line 152. The GGSN 160 is coupled to the SGSN 140 via signal line 162, and the CSCF 150 is coupled to the HLR 130 via signal line 133. The interface connection 132 between the SGSN 140 and the HLR 130 is referred to as the Gr interface. The interface connection 162 between the SGSN 140 and the GGSN 160 is referred to as the Gn interface.

The interface connection 105 between the SGSN 140 and the BSC 111 of BSS 110 is the Gb interface. The data transmission between the SGSN 140 and BSC 111 flows through the Gb interface 105 thereby permitting communication between the BSS 110 and the GPRS 100. GPRS 100 is also coupled to other networks (not shown), such as a PSTN, the Internet, or other GPRSs, as described in FIG. 1.

With respect to initiating and supporting a wireless packet-based communication between the GPRS 100 and the mobile node 180, three procedures are used in the present invention. These procedures include the Configuration procedure, the Add procedure, and the Delete procedure. The combination of these procedures will permit a BSS 110 and SGSN 140 to exchange information on IP endpoint addresses, User Datagram Protocol ("UDP") port numbers, and monitor the capacity of communication endpoints over the Gb interface 105. An IP endpoint is an endpoint defined by its IP address and UDP Port number.

Packet Data Units (PDU)

Packet Data Units (PDU) is the message format used to transmit data and signaling information on the interface system. Five types of PDU messages used in the present system include the SNS-CONFIG PDU, the SNS-CONFIG-ACK PDU, the SNS-ADD PDU, the SNS-DELETE PDU, and the SNS-ACK PDU message.

The informational elements of an SNS-CONFIG PDU are 1) a PDU Type 2) an End Flag, and 3) IP4 or IP6 data elements. The PDU Type identifies the type of PDU message as an SNS-CONFIG PDU message. An End Flag data element, when set with a value of '1', signifies that the present PDU message is the final configuration message.

Both the BSS 110 and the SGSN 140 use the SNS-CONFIG-ACK PDU message to acknowledge receipt of an SNS-CONFIG PDU message. The contents of an SNS-CONFIG-ACK PDU are 1) a PDU Type and 2) a Cause. The PDU Type identifies the PDU as an SNS-CONFIG-ACK PDU, and the Cause data value indicates any detected abnormal conditions that may arise in the configuration action.

The information elements of an SNS-ADD PDU include: (1) a PDU Type, (2) Transaction ID, and (3) IP4 or IP6 data elements. The PDU Type identifies the PDU as an addition signal. The Transaction ID is a value set by the BSS 110 or SGSN 140 to provide an identity element for the PDU.

The information elements of an SNS-DELETE PDU include: (1) a PDU Type, (2) a Transaction ID, and (3) IP4 or IP6 data elements. The PDU Type identifies the PDU as an SNS-DELETE PDU. The Transaction ID is an identifier for the SNS-DELETE PDU and is used in an SNS-ACK PDU sent to the transmitting BSS or SGSN to identify the PDU being acknowledged.

The information elements of an SNS-ACK PDU include: (1) a PDU Type, (2) a Transaction ID, and (3) a Cause data element. The PDU Type in the data packet identifies the type of PDU being sent as an acknowledgment signal. The Transaction ID is a value element copied from earlier PDU messages. The Transaction ID value element is set by the applicable BSS 110 or the SGSN 140 to identify the PDU being acknowledged. The final data element is a Cause, which can be used to indicate error information in the event of a failure in the addition or deletion operation.

The IP4 elements and IP6 data elements in the PDU messages are essentially identical for each type of PDU message. The IP4 data elements contain at least one IP4 address. For each IP4 data element, there is a Type identifier, a UDP Port Value, an IPv4 address, a Signaling Weight, and a Data Weight. The IP6 data elements contain at least one IP6 element. For each IP6 data element, there is a Type identifier, a UDP Port Value, an IPv6 address, a Signaling Weight, and a Data Weight. A Length Indicator is also used to indicate the number of IP addresses in an IP4 or IP6 data.

Configuration Procedure

Figure 3:
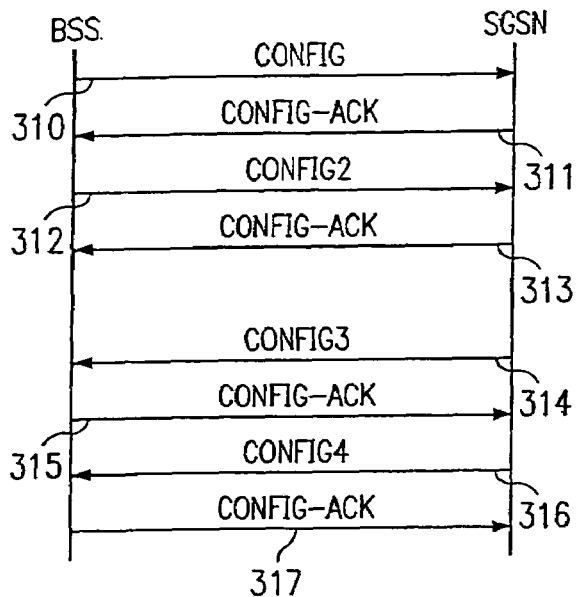
FIG. 3 is a message flow chart describing the present invention for a configuration procedure.

A Configuration procedure utilizing SNS messages in packet data units (PDU) format will allow for the exchange of IP endpoint information between a BSS 110 and the SGSN 140 upon initialization. Initialization procedures are necessary upon start or restart of a BSS 110, movement of a mobile node 180 into the cellular area supported by BSS 110, or power-up of a mobile node in the cellular area supported by the BSS 110. Start and restart procedures are performed by the BSS upon power-up of the system, after a power interruption, or after a manual or automatic re-boot operation. The message flow for the Configuration procedure is set forth in FIG. 3 with the message flow between SGSN 140 and the associated BSS 110.

The procedure is initiated by an SNS-CONFIG PDU 310 sent from the BSS 110 to the SGSN 140 using any provisioned IP endpoints. The BS BSS 110 starts a time period Tns_prov with the transmission of the configure message 310. The Tns_prov is a time period within which the SGSN 140 should acknowledge the configure message 310.

The SNS-CONFIG PDU 310 message also includes identification of one or more IP endpoints. Upon receipt of the SNS-CONFIG PDU 310 from the BSS 110, the SGSN 140 sends an SNS-CONFIG-ACK PDU message 311 to the BSS 110. The BSS 110 will then transmit the SNS-CONFIG-ACK PDU 311 to the mobile node 180 as a source IP endpoint from which SNS-CONFIG PDU 310 was initially sent. An SNS-CONFIG-ACK PDU message 311 may also indicate any abnormal condition in the configuration action by including a conditional data element based upon the abnormal condition.

Upon receipt of the SNS-CONFIG-ACK PDU 311 from the SGSN 140, the BSS 110 stops the counter on the timer Tns_prov. If the BSS 110 has more IP endpoints to configure based upon other configure messages 310, the BSS 110 will restart timer Tns_prov for those other configure messages. After receiving the acknowledge message 311, the BSS 110 will transmit an SNS-CONFIG2 PDU message 312 to the SGSN 140. If the BSS 110 has no more IP endpoints to establish, the end flag will be set to '1' in SNS-CONFIG2 PDU message 312 signifying that the configure message 312 is the final configuration message 312 to be sent by the BSS 110. The SGSN 140 will acknowledge the final configuration message 312 with an SNS-CONFIG-ACK PDU 313 sent to the BSS.

In order to route packets to the correct mobile node, the BSS 110 needs to possess information on the IP endpoint address of the mobile node 180. After initiation of the configuration procedure by the BSS 110, the SGSN 140 sends an SNS-CONFIG3 PDU message 314 to the BSS 110 using any known IP endpoints. This SNS-CONFIG3 PDU 314 message may be sent at any time after the SGSN 140 receives a request to initiate an IP endpoint.

Upon sending the SNS-CONFIG3 PDU message 314, the SGSN 140 starts timer Tns_prov to make sure the SGSN 140 receives an SNS-CONFIG-ACK PDU 315 from the BSS 110 within a specified period of time. The SNS-CONFIG3 PDU 314 contains one or more IP endpoints.

Upon receipt of an SNS-CONFIG3 PDU 314 sent by the SGSN 140, the BSS 110 sends an SNS-CONFIG-ACK PDU 315 to the SGSN 140. Upon receipt of acknowledgment message 315, the SGSN 140 forwards a message onto the source IP endpoint from which the SNS-CONFIG PDU 314 was sent. (e.g., network computer, remote mobile node, etc.). The SNS-CONFIG-ACK PDU 315, like other PDUs, may indicate any abnormal condition by including a data element indicating the abnormal condition.

The SGSN 140 will stop the timer Tns_prov upon receipt of the acknowledgment message 315. If the SGSN 140 has additional IP endpoints to configure, the SGSN 140 will restart the timer Tns_prov for the other configuration time periods. After receiving acknowledgement signal 315, the SGSN 140 will send SNS-CONFIG4 PDU 316 to the BSS 110. If the SNS-CONFIG4 PDU 316 sent is the final configuration message presently needed, the end flag value in the configuration message 316 will be set to '1'. This end flag will signify that no more SNS-CONFIG PDU messages will follow after SNS-CONFIG4 PDU 316. The BSS 110 will transmit a final SNS-CONFIG-ACK PDU 317 to the SGSN 140 in response to SNS-CONFIG4 PDU 316.

Upon receiving the final SNS-CONFIG PDU message, for example configure message 316, the SGSN 140 will perform an error checking procedure. The SGSN 140 will confirm the receipt of all endpoints sent from the BSS 110. If the SGSN 140 does not receive all of the transmitted endpoints, the SGSN will send an error PDU message indicating "Invalid number of IP endpoints." (with indication of IP4 or IP6). For IP6, the number of IP6 endpoints specified by the BSS 110 by an SNS-SIZE PDU sent before the configuration procedure.

After identification of this "invalid number" error condition, the SGSN 140 shall clear all information associated with the erroneous interface connection from the BSS 110. Also in response to the error condition, the BSS 110 shall notify the Operations and Maintenance (O&M) system of the error and abort the interface connection procedure. The BSS 110 shall then clear all information associated with the erroneous interface connection from the SGSN 140.

Upon expiration of timer Tns_prov, the BSS 110 or SGSN 140 may retry the configuration operation an SNS-CONFIG-RETRIES number of times. If the configuration operation is unsuccessfully attempted more than a predetermined number of times, the interface system will notify the O&M system and abort the interface communication procedure. After all the IP endpoints are initially configured onto the Gb interface 105, the maintenance of the interface will require the addition or deletion of IP endpoints.

Add Procedure

Figure 4:
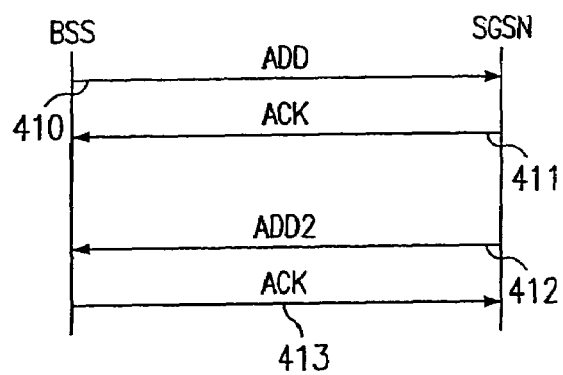
FIG. 4 is a message flow chart describing the present invention for an add procedure.

The Add procedure informs either the BSS or the SGSN about new IP endpoint information for an endpoint being added to the Gb interface 105. This Add procedure provides for dynamic increases in either BSS or SGSN capacity without taking system elements (e.g. BSS or SGSN) out of service to conduct a new initiation procedure. FIG. 4 shows the message flow diagram for the Add procedure.

If the BSS 110 has new IP endpoints, the BSS 110 sends an SNS-ADD PDU message 410 to the SGSN 140. The BSS 110 starts timer Tns_prov within which period of time the SGSN 140 should respond with an acknowledgment message. The SNS-ADD PDU message 410 will contain a transaction ID that uniquely identifies the SNS-ADD PDU 410. This transaction ID is incremented (modulo 256) for each SNS-ADD PDU message sent by the BSS 110. The addition message 410 also contains one or more IP endpoints, in either IPv4 format or IPv6 format.

Upon receipt of the SNS-ADD PDU message 410 from the BSS 110, the SGSN 140 responds with an SNS-ACK PDU 411 to the BSS 110. In response to the receipt of message 411, the BSS 110 forwards the message to the source of the IP endpoint from which the SNS-ADD PDU 410 was sent. The SNS-ACK PDU message 411 also contains a transaction ID with the same value as that in the SNS-ADD PDU 410. Upon receipt of the SNS-ACK PDU message 411 by the BSS 110, the BSS 110 stops timer Tns_prov.

If the SGSN 140 has new IP endpoints, the SGSN 140 sends an SNS-ADD2 PDU message 412 to the BSS 110. After receiving the addition message 412, the SGSN 140 starts the timer Tns_prov within which time the BSS 110 should acknowledge the addition message 412. The SNS-ADD2 PDU 412 contains a transaction ID to uniquely identify the SNS-ADD2 PDU 412, which is incremented (modulo 256) for each SNS-ADD PDU sent. It also contains one or more IP endpoints in IPv4 or IPv6 format.

Upon receipt of an SNS-ADD2 PDU 412 from the SGSN 140, the BSS 110 sends an SNS-ACK PDU message 413 to the SGSN 140. The SGSN 140 then forwards the acknowledge message 413 to the source IP endpoint from which the SNS-ADD PDU2 412 was sent. The SNS-ACK PDU message 413 contains a transaction ID with the same value as that in the SNS-ADD2 PDU 412. Upon receipt of the SNS-ACK PDU message 413 by the SGSN 140, the SGSN 140 stops timer Tns_prov.

The interface system will check for time-outs in the system and other error conditions. If time Tns_prov expires before an acknowledgement signal is received, the additional procedure will be attempted again up to a predetermined number of times. After the addition procedure is attempted over SNS-ADD-RETRIES number of times, the interface system will notify the O&M system and abort the addition procedure.

Delete Procedure

Figure 5:
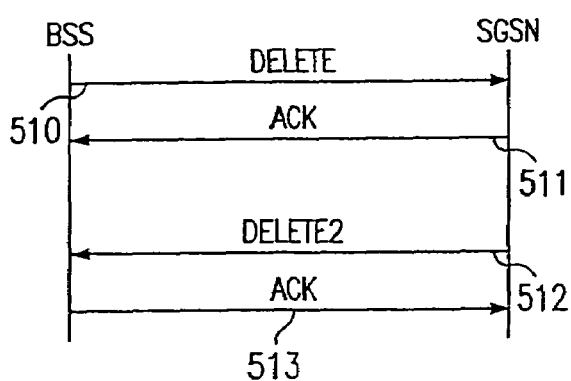
FIG. 5 is a message flow chart describing the present invention for a delete procedure.

The Delete procedure is used to inform the interface system that an IP endpoint is no longer required to be supported on the Gb interface. This procedure provides for dynamic decrease of the interface capacity without taking the system elements (e.g. BSS 110 or SGSN 140) out of service to conduct a new initiation procedure. The Delete Procedure is used to inform the interface system that the BSS 110 or SGSN 140 is no longer accepting Network Service Data units addressed to the identified IP endpoint. A message flow diagram for the delete procedure is shown in FIG. 5.

If the BSS 110 is deleting an IP endpoint, the BSS 110 sends an SNS-DELETE PDU message 510 to the SGSN 140. Upon transmission of the delete message 510, the BSS 110 starts timer Tns_prov. The SNS-DELETE PDU message 510 will contain a transaction ID to identify the SNS-DELETE PDU 510. This transaction ID is incremented (modulo 256) for each SNS-DELETE PDU sent by the BSS 110. The delete message 510 also contains one or more IP endpoints in IPv4 or IPv6 format.

Upon receipt of an SNS-DELETE PDU message 510 from the BSS 110, the SGSN 140 sends an SNS-ACK PDU 511 to the BSS 110. The BSS 110 then forwards the message to the source IP endpoint from which the SNS-DELETE PDU 510 was sent. The SNS-ACK PDU 511 contains a transaction ID with the same value as the value element in the SNS-DELETE PDU 510. Upon receipt of the SNS-ACK PDU 511 by the BSS 110, the BSS 110 stops timer Tns_prov.

If the SGSN 140 has IP endpoints to delete, the SGSN 140 sends an SNS-DELETE2 PDU message 512 to the BSS 110. Upon transmission of message 512, the SGSN 140 starts timer Tns_prov. The SNS-DELETE2 PDU 512 contains a transaction ID that identified the PDU as the SNS-DELETE2 PDU 512 and one or more EP endpoints in IPv4 or IPv6 format. Upon receipt of an SNS-DELETE2 PDU 512 from the SGSN 140, the BSS 110 sends an SNS-ACK PDU 513 to the SGSN 140. The SGSN 140 then forwards the message to the source IP endpoint from which the SNS-DELETE2 PDU 512 was sent. The SNS-ACK PDU 513 contains a transaction ID with the same value as that found in SNS-DELETE2 PDU 512. Upon receipt of the SNS-ACK PDU 512, the SGSN 140 also stops timer Tns_prov.

The interface system also checks for error conditions during the deletion procedure. Upon expiration of time period Tns_prov, the deletion procedure may be retried up to a predetermined SNS-DELETE-RETRIES number of times. If the operation is attempted SNS-DELETE-RETRIES times without success, then the O&M system will be notified of the error condition and an abort procedure will be conducted.

While the invention has been particularly shown and described with respect to preferred embodiments, it will be readily understood that minor changes in the details of the invention may be made without departing from the spirit of the invention. Having described the invention, we claim:

What is claimed is:

1. A method for initializing a packet-based communications interface between a wireless communication system and a packet-based communication system, comprising the steps of:
   receiving a first configuration message from the wireless communication system at a first node on the packet-based communication system, the first configuration message containing destination information and an endflag indicator, said first configuration message generated by the wireless communication system in response to an initiation procedure; and
   transmitting a first acknowledgement message from the first node on the packet-based communication system after receiving the first configuration message from the wireless communication system.

2. The method of initializing a packet-based communications interface of claim 1 wherein the first configuration message has a message type indicator.

3. The method of initializing a packet-based communications interface of claim 1 wherein the first configuration message has one or more Internet Protocol endpoint addresses.

4. The method of initializing a packet-based communications interface of claim 1 wherein the first configuration message has a message type indicator and at least one Internet Protocol endpoint addresses.

5. The method of initializing a packet-based communications interface of claim 1 further comprising the steps of:
   transmitting a second configuration message from the first node on the packet-based communication system, the second configuration message containing destination information and being transmitted after the first node receives the first configuration message;
   receiving a second acknowledgement message at the first node after the wireless communication system receives the second configuration message.

6. The method of initializing a packet-based communications interface of claim 5 wherein the second configuration message has a message type indicator.

7. The method of initializing a packet-based communications interface of claim 5 wherein the second configuration message has an endflag indicator.

8. The method of initializing a packet-based communications interface of claim 5 wherein the second configuration message has one or more Internet Protocol endpoint addresses.

9. The method of initializing a packet-based communications interface of claim 5 wherein the second configuration message has a message type indicator, an endflag indicator and at least one Internet Protocol endpoint addresses.

10. A method for initializing a packet-based communications interface between a wireless communication system and a packet-based communication system, comprising the steps of:
    receiving a first configuration message from the packet-based communication system, the first configuration message containing destination information;
    transmitting a first acknowledgement message in response to receiving the first configuration message from the wireless communication system.

11. The method of initializing a packet-based communications interface of claim 10 wherein the first configuration message has a message type indicator.

12. The method of initializing a packet-based communications interface of claim 10 wherein the first configuration message has an endflag indicator.

13. The method of initializing a packet-based communications interface of claim 10 wherein the first configuration message has one or more Internet Protocol endpoint addresses.

14. The method of initializing a packet-based communications interface of claim 10 wherein the first configuration message has a message type indicator, an endflag indicator and at least one Internet Protocol endpoint addresses.

15. The method of initializing a packet-based communications interface of claim 10 wherein the first acknowledgement message comprises a cause element identifying a problem with the configuration process.

16. A packet-based interface system coupled between a packet-based network and a wireless communication network comprising:
- at least one serving support node on the packet-based network, where said serving support node is capable of transmitting and receiving a configuration message with one or more destination addresses;
- a base station subsystem on the wireless communication network, said base station subsystem being capable of transmitting and receiving a configuration message with one or more destination addresses; and
- an acknowledgment message transmitted in response to receipt of a configuration message, said acknowledgment message containing a data element for indicating an abnormal condition in the configuration action.

17. The system of claim 16 wherein the interface system transmits a configuration message upon the initiation of a start procedure.

18. The system of claim 16 wherein the interface system transmits a configuration message upon the initiation of a restart procedure.

19. The system of claim 16 wherein the interface system transmits a configuration message upon adding endpoint information.

20. The system of claim 16 wherein the interface system transmits a configuration message upon deleting endpoint information.

* * * * *